(12) United States Patent
Hong (10) Patent No.: US 10,054,447 B2
(45) Date of Patent: Aug. 21, 2018

(54) LAZIER GRAPH-BASED PATH PLANNING FOR AUTONOMOUS NAVIGATION

(71) Applicant: Sharp Laboratories of America, Inc., Camas, WA (US)

(72) Inventor: Soonhac Hong, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 80 days.

(21) Appl. No.: 15/239,664

(22) Filed: Aug. 17, 2016

(65) Prior Publication Data

US 2018/0051991 A1 Feb. 22, 2018

(51) Int. Cl.
| | |
|---|---|
| *G01C 21/20* | (2006.01) |
| *G05D 1/02* | (2006.01) |
| *B25J 9/16* | (2006.01) |
| *G01C 21/34* | (2006.01) |

(52) U.S. Cl.
CPC ............ *G01C 21/20* (2013.01); *B25J 9/1664* (2013.01); *G01C 21/3446* (2013.01); *G05D 1/0212* (2013.01); *Y10S 901/01* (2013.01); *Y10S 901/47* (2013.01)

(58) Field of Classification Search
CPC .... G01C 21/20; G01C 21/3446; B25J 9/1664; G05D 1/0212; Y10S 901/47; Y10S 901/01
See application file for complete search history.

(56) References Cited

U.S. PATENT DOCUMENTS

| | | | |
|---|---|---|---|
| 2011/0035087 A1 | 2/2011 | Kim et al. | |
| 2017/0193830 A1* | 7/2017 | Fragoso | ............... G08G 5/0069 |

FOREIGN PATENT DOCUMENTS

| | | |
|---|---|---|
| EP | 2806324 A1 | 11/2014 |
| KR | 20130112507 A | 10/2013 |
| KR | 101339480 B1 | 12/2013 |

OTHER PUBLICATIONS

Hauser, Kris "Lazy Collision Checking in Asymptotically-Optimal Motion Planning" archived Mar. 8, 2016 (see attached PDF version).*

(Continued)

*Primary Examiner* — Mussa A Shaawat
*Assistant Examiner* — Michael V Kerrigan
(74) *Attorney, Agent, or Firm* — ScienBiziP, P.C.; Steve Reiss (57) ABSTRACT

A navigation method comprises receiving data modeling an environment, finding an optimal path to a goal in the environment, and reporting the optimal path to a navigation system. An autonomous vehicle comprises a path-finding system configured to receive data modeling an environment to be traversed and to find an optimal path to a goal. The vehicle further comprises a navigation system configured to receive the optimal path and to formulate drive data for driving the vehicle along the optimal path. The vehicle further comprises a drive system configured to receive the drive data and to drive the vehicle along the optimal path. A navigation device comprises a path-finding system configured to receive data modeling an environment and to find an optimal path to a goal. The navigation device further comprises a display configured to receive the optimal path and to represent the optimal path in a human-readable format.

19 Claims, 10 Drawing Sheets

(56) References Cited

OTHER PUBLICATIONS

Bohlin, R. et al., "Path Planning Using Lazy PRM," Proceedings of the 2000 IEEE International Conference on Robotics & Automation (ICRA '00), vol. 1, Apr. 24, 2000, San Francisco, California, 8 pages.

Branicky, M. et al., "Quasi-Randomized Path Planning," Proceedings 2001 IEEE International Conference on Robotics & Automation (ICRA '01), vol. 2, May 21, 2001, Seoul, Korea, 7 pages.

Nash, A. et al., "Lazy Theta*: Any-Angle Path Planning and Path Length Analysis in 3D," Proceedings of the Twenty—Fourth AAAI Conference on Artificial Intelligence (AAAI-10), Jul. 11, 2010, Atlanta, Georgia, 8 pages.

\* cited by examiner

LAZIER GRAPH-BASED PATH PLANNING FOR AUTONOMOUS NAVIGATION

TECHNICAL FIELD

This application relates to the field of autonomous and assisted navigation, and more particularly, to robot navigation.

BACKGROUND

Mobile, autonomous robots exist today, and may become commonplace in years to come. Some robots use a graph-based path-planning algorithm (PPA) to navigate amid obstacles in their environment. Graph-based PPA implementation is computationally expensive, however, especially when applied in complex, obstacle-ridden environments. The burden of providing excessive compute power to support basic navigation presents a challenge to the widespread adoption of robotics for personal and commercial use.

SUMMARY

One aspect of this disclosure is directed to a navigation method. The method comprises receiving data modeling an environment to be traversed, finding an optimal path to a goal, and reporting the optimal path to a navigation system. Another aspect is directed to an autonomous vehicle comprising a path-finding system. The path-finding system includes a processor and an associated nonvolatile memory. The nonvolatile memory holds instructions that cause the processor to receive data modeling an environment to be traversed and to find an optimal path to a goal. The vehicle further comprises a navigation system configured to receive the optimal path as navigation data and to formulate drive data for driving the vehicle along the optimal path. The vehicle further comprises a drive system configured to receive the drive data and to drive the vehicle pursuant to the drive data, along the optimal path. Another embodiment is directed to a navigation device comprising a path-finding system. The path-finding system includes a processor and an associated nonvolatile memory. The nonvolatile memory holds instructions that cause the processor to receive data modeling an environment to be traversed and to find an optimal path to a goal. The navigation device further comprises a display configured to receive the optimal path as navigation data and to represent the optimal path in a human-readable format.

The Summary above is provided to introduce a selected part of this disclosure in simplified form, not to identify key or essential features. The claimed subject matter, defined by the claims, is limited neither to the content of this Summary nor to implementations that address the problems or disadvantages noted herein.

BRIEF DESCRIPTION OF THE DRAWINGS

This disclosure will be better understood from reading the following Detailed Description with reference to the attached drawing figures, wherein.

DETAILED DESCRIPTION

This disclosure is directed to improving the computational efficiency of a graph-based path-planning algorithm (PPA). Graph-based PPAs may be used for navigation, including autonomous vehicle and robotic navigation. Non-limiting examples of graph-based PPAs include the so-called A* and Theta* algorithms. A state-of-the-art graph-based PPA includes at least two computational phases: a graph-construction phase and a subsequent path-search phase. In the graph construction phase, a navigation graph is instantiated and populated with a plurality of navigation nodes and with a plurality of navigation edges constructed between adjacent navigation nodes. In the subsequent path-search phase, the PPA discovers an optimal path from a beginning node B to a goal node G.

During the graph-construction phase, significant computational effort may be applied to generating the navigation nodes in obstacle-free space and to detecting obstacles between the navigation nodes, in order to construct the navigation edges. However, nodes and edges that lie far from the optimal path are not necessarily used during the path-search phase. Computational effort applied in generating the far-away nodes and edges is wasted.

In order to address the above issue, a class of so-called 'Lazy' PPAs have been developed. Examples include Lazy A* and Lazy Theta*. To reduce the computational expense associated with navigation nodes and edges located outside of the optimal path, these algorithms ignore, during the path-search phase, nodes and edges that intersect an obstacle. In other words, obstacle-occluded navigation nodes and obstacle-intersecting navigation edges are not expressly evaluated. Lazy PPAs reduce computational expense during the graph-construction phase, but do not completely remove the burden caused by the far-away nodes and edges, because such features (including those occluded by or intersecting an obstacle) are still generated during the graph-construction phase.

To further improve the computational efficiency of graph-based PPAs, the inventors herein have devised a 'Lazier' class of PPA. These new algorithms forego generating any navigation nodes and edges during the initial graph-construction phase, but merely define a navigation-graph structure. In the path-search phase, navigation nodes and edges are generated dynamically, according to the graph structure so defined, but only those actually needed to discover the optimal path are evaluated. As the navigation graph is built up incrementally during the path-search phase, navigation nodes and edges far from the optimal path are never generated, and thus the computational expense of the graph-construction phase can be greatly reduced.

Aspects of this disclosure will now be described by example and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

Figure 1:
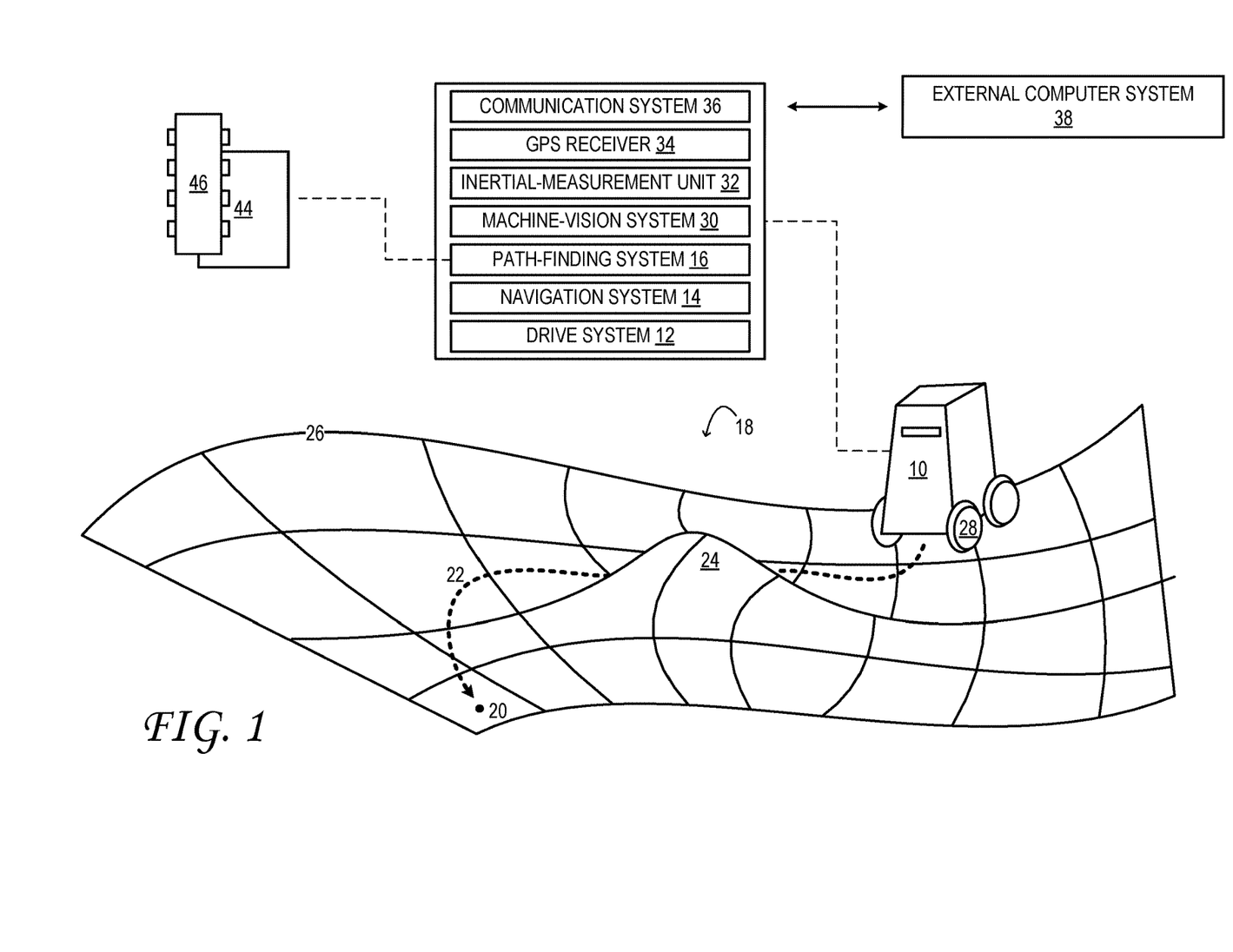
FIG. 1 shows aspects of an example autonomous vehicle.

FIG. 1 shows aspects of an example autonomous vehicle 10 in the form of a robot. The vehicle includes a drive system 12, a navigation system 14 configured to control the drive system, and a path-finding system 16 configured to control the navigation system. In FIG. 1, the vehicle is shown navigating an environment 18, which is represented abstractly. Arranged in the environment is a goal 20 and an optimal path 22 from the current position of the vehicle to the goal. The environment also includes an obstacle 24 in the form of a steep hill arranged between the current position of the vehicle and the goal. The vehicle is configured to navigate from its current position to the goal while avoiding the obstacle, and any other obstacle that may present a navigation hazard. Moreover, the vehicle may be configured to navigate with optimal efficiency—i.e., to select the path of lowest overall cost from among a plurality of possible paths leading to the goal.

The cost of navigation is an abstract quantity and should be interpreted somewhat generically, for it may differ in the different embodiments of this disclosure. In some embodiments, drive system 12 of vehicle 10 may be powered by a finite supply of fuel or by a battery. The cost may relate, therefore, to the amount of energy the vehicle expends in navigating from its current position to the goal. Such cost may increase in proportion to the total distance traveled, but also may be affected by the gradient along the path travelled. Ascending and descending a steep gradient along the shortest path to the goal may consume more energy than taking a longer, flatter path. The opposite may be true if regenerative braking is available during the descent, to allow recovery of at least some of the energy expended during the ascent. In other examples, the cost may relate more directly to the time spent in getting to the goal, rather than the energy consumed. The skilled reader will be aware of still other factors that may influence the cost, depending on the embodiment and scenario. Further description of cost is provided hereinafter, with reference to the path-finding methods here disclosed.

In the example of FIG. 1, environment 18 presents a solid surface topology 26. Accordingly, drive system 12 includes wheels 28. In other examples, the drive system may include any suitable land- or water-contacting drive element—e.g., a traction loop, moving feet, an impeller. In still other examples, the environment may be an aerial environment; the vehicle may be a drone airplane, helicopter, blimp, etc., configured to navigate through the air; and the drive system may include one or more propellers, jet engines, or rocket thrusters.

As noted above, path-finding system 16 of vehicle 10 is configured to discover an optimal path from among a plurality of possible paths leading from the vehicle's current position to the goal. To this end, the path-finding system receives data modeling environment 18. Such data may represent the dimensions and topology of the environment, and may further represent one or more obstacles within the environment Obstacles may include steep gradients, hazardous terrain, another vehicle, etc. The path-finding system may receive the data from one or more different sources, or from a combination thereof.

In the example of FIG. 1, vehicle 10 includes a machine-vision system 30. The machine-vision system may include one or more cameras configured to detect one or more obstacles in environment 18. Such cameras may include color cameras, infrared cameras, video cameras, stereo and/or depth cameras, for example. In some examples, the machine-vision system may include sonar or any other range-finding or object-detection technology. Accordingly, at least some of the data modeling the environment may be received from the machine-vision system.

Vehicle 10 also includes an inertial-measurement unit 32. The inertial-measurement unit may include one or more accelerometers, gyroscopes, inclinometers, and/or magnetometers configured to assess the motion of the vehicle within environment 18. As the vehicle traverses the environment, the vehicle may encounter a gradient or other environmental feature or condition that causes a hitherto unexpected change in inclination, elevation, acceleration, or orientation. Such change may be detected by the inertial-measurement unit. In some scenarios, such change may be used to modify the computation of cost along any given path traversing the environment. In some scenarios, such change may indicate the presence of an obstacle along the path. Accordingly, at least some of the data modeling the environment may be received from the inertial measurement unit. Vehicle 10 may also include a global-positioning system (GPS) receiver 34 configured to establish the vehicle's current position within the environment.

Vehicle 10 also includes a communication system 36. The communication system may be a two-way wireless system, in some examples. The communication system may be configured to exchange data with an external computer system 38. Such data may include commands, instructions, etc., for vehicle operation and/or navigation. At least some of the data modeling environment 18 may be received from the communication system.

In the example of FIG. 1, navigation system 14 is a component of vehicle 10. The navigation system exerts control over drive system 12 and is itself controlled by path-finding system 16. For instance, the path-finding system may compute the optimal path from the vehicle's current position to goal 20, and report the optimal path to the navigation system in the form of navigation data. The navigation data may include instructions tantamount to 'advance five meters due north, turn forty-five degrees west and advance another ten meters,' for instance. The navigation system is configured to receive the navigation data, and, with benefit of vehicle-orientation data from inertial-measurement unit 32 and/or vehicle-position data from GPS receiver 34, to formulate drive data for driving the vehicle along the optimal path. In some examples, the navigation system may determine the amount of steering rotation and forward power to apply to drive system 12. The drive system, in turn, receives the drive data, and, pursuant to the drive data, drives the vehicle along the optimal path.

Figure 2:
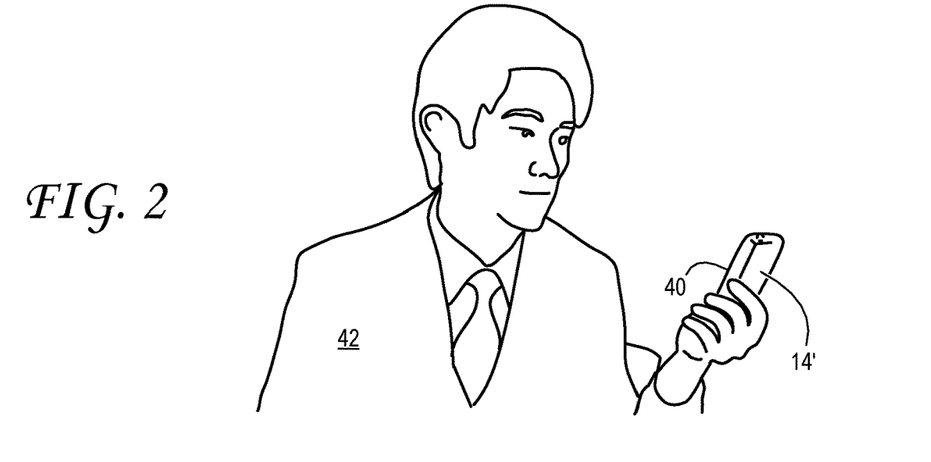
FIG. 2 shows aspects of an example navigation device.

In other examples, the navigation system may be different. In the example shown in FIG. 2, navigation device 14' takes the form of a portable, handheld device, such as a cell phone. Navigation device 14' includes a display 40 which displays the navigation data in a human-readable format, to user 42. In this example, the user is a kind of surrogate for drive system 12 of the previous embodiment. Navigation device 14' may include an inertial-measurement unit and GPS receiver and may be configured to execute a navigation app to guide the user to his desired destination or goal. In this, as in the previous example, a path-finding system operatively coupled to the navigation device determines the optimal path from the current position to the goal. In other, related examples, a navigation device having the above functionality may be installed in a vehicle.

In these and other embodiments, a path-finding system is configured to find the optimal path to a goal in the vehicle or user's environment. Path-finding system 16 includes, to this end, a processor 44 and an associated nonvolatile memory 46 (shown schematically in FIG. 1). The nonvolatile memory holds instructions that cause the processor to execute one or more path-finding methods, examples of which are described further below. Further description of an example processor and associated memory are appended following the description of FIGS. 11A and 11B.

Figure 3:
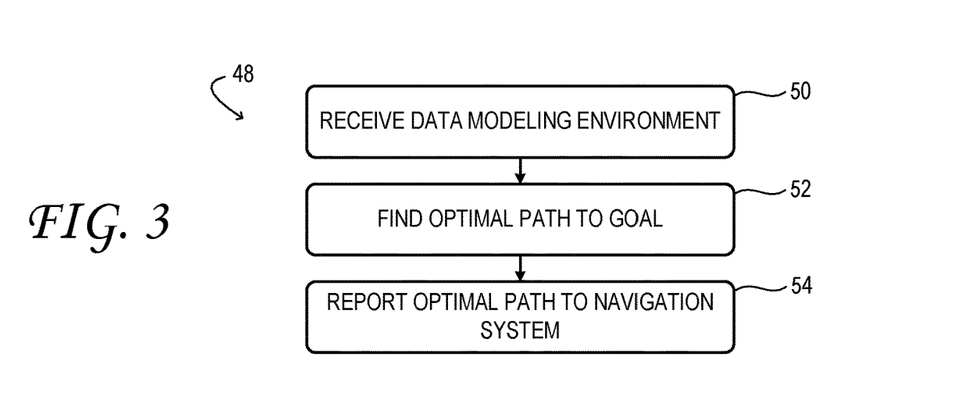
FIG. 3 illustrates an example navigation method.

In some implementations, a path-finding method may be incorporated into an end-use navigation method for an autonomous vehicle or navigation device. FIG. 3 illustrates an example navigation method 48. At 50 of method 48, path-finding system 16 receives data that models an environment 18 to be traversed. At 52, the path-finding system discovers the optimal path through the environment, from a beginning or current position to a goal. To this end, the path-finding system may invoke a PPA. At 54, the optimal path is reported to a navigation system to guide traversal of the environment.

Figure 4:
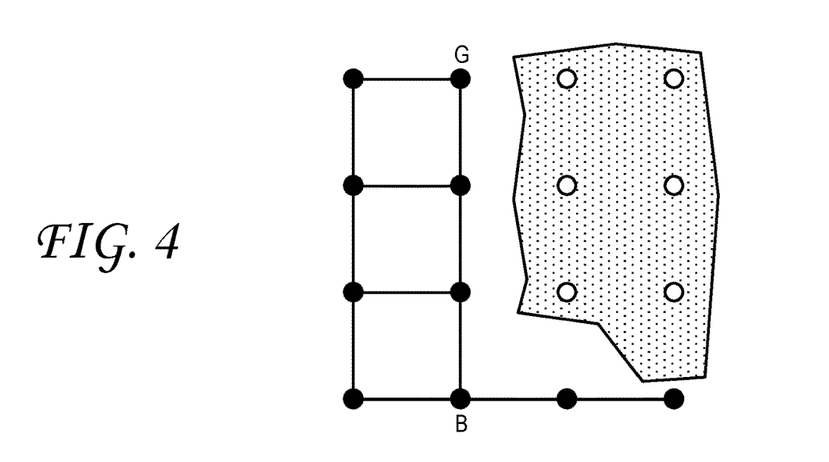
FIG. 4 shows aspects of an example occupancy grid map.

At 52 of method 48, path-finding system 16 may create a navigation graph of environment 18 by dividing the environment into grid cells, generating a navigation node at the center of each unoccupied grid cell, and constructing edges that connect adjacent nodes with no obstacle in between. These steps may be accomplished during an initial graph-construction phase of a PPA. FIG. 4 shows an example navigation graph in the form of an occupancy graph. In this drawing, solid circles represent nodes, lines between solid circles represent edges, and open circles represent obstacle-occluded nodes. The initial position of vehicle 10 is represented by a beginning node B, and the goal is represented by goal node G. The shaded area represents obstacle 24. In the subsequent path-search phase, the path finding system discovers an optimal path from B to G, which avoids the obstacle.

Figure 5:
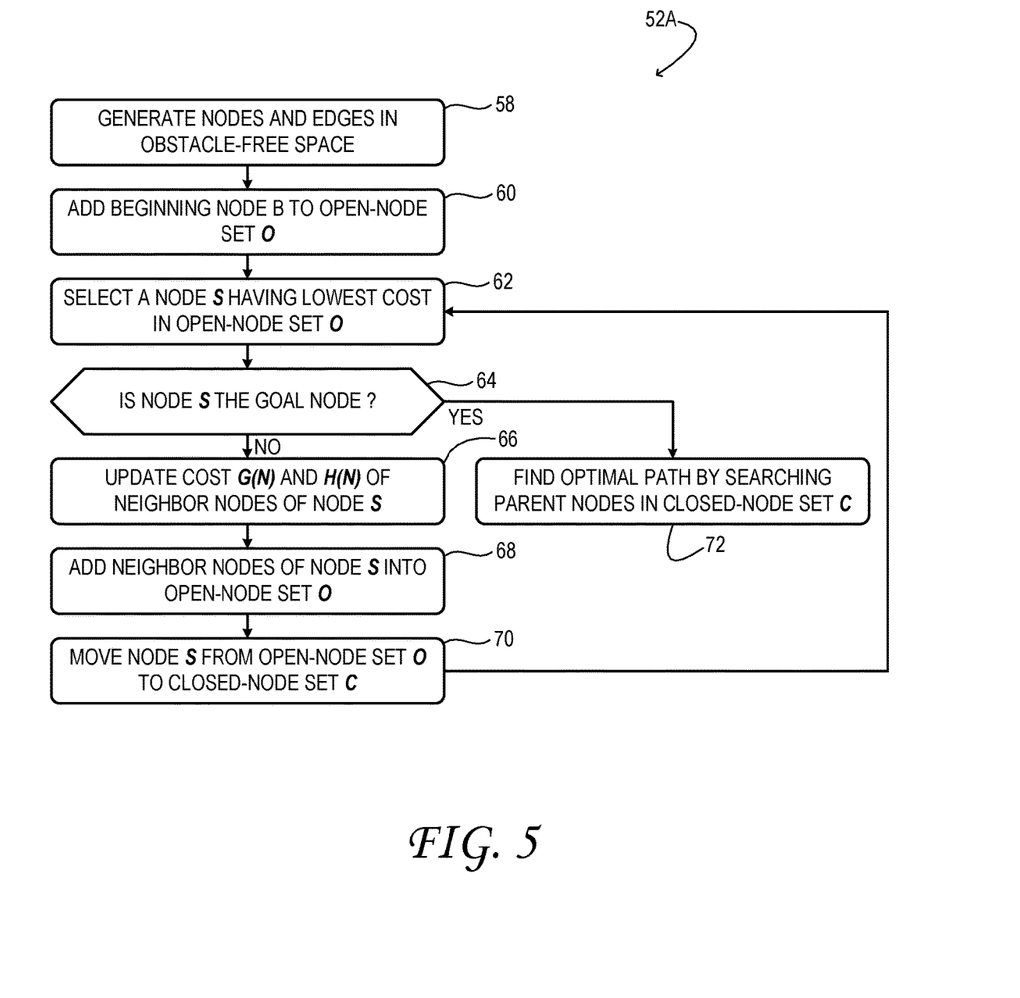
FIGS. 5 and 6 illustrate example path-finding methods.

FIG. 5 illustrates an example path-finding method 52A. Method 52A, like methods 52B, 52C, and 52D, described further below, may be used as particular instances of path-finding step 52 of method 48. The path-finding methods may also be used in other contexts, and independently.

Method 52A is an implementation of the A* PPA. At 58 nodes and edges are generated in obstacle-free space. At 60 a beginning node B is added to open-node set O. In some examples, this can be done by appending the beginning node B to a data structure representing the open-node set O. The term open-node set refers to a set of open nodes, and the data structure holding the set itself may be closed (i.e., of fixed size) or open (i.e., of variable size). Alternatively, the open-node set may be defined in a manner other than by a data structure configured to hold a set. For example, each node in the set may be associated with a flag that indicates whether the node is currently included in the open node set O, or in the closed-node set C. At 62 a node S of lowest cost is selected from the open-node set. At 64 it is determined whether S coincides with goal node G, or whether S coincides with or differs from the goal node. If S coincides with the goal node G, then an optimal path from B to G is found, at 72, by searching each node in C for a parent node in C. If, at 64, it is determined that S differs from the goal node, then at 66 the cost functions g(n) and h(n) of all neighbor nodes of the node S are updated. The overall cost function $f(n)$ of a navigation node n is given by $$f(n)=g(n)+h(n),$$

where, g(n) is the cost of the $n^{th}$ node from beginning node B, and h(n) is a heuristic cost of the $n^{th}$ node to goal node G. At 68 the neighbor nodes of node S are added to open-node set O. At 70, node S is moved from open-node set O to closed-node set C, and the method returns to 62. If, however, it is determined at 64 that the node S of lowest cost coincides with the goal node, then the method advances to 72, where the optimal path is found by searching each node in C for a parent node in C.

A disadvantage of the A* PPA is that nodes and edges far from the optimal path are evaluated unnecessarily. In the next example, the computational expense of graph construction is reduced by avoiding redundant obstacle evaluation for nodes and edges far away from the path. To avoid redundant obstacle evaluation in the graph construction phase, obstacle evaluation is moved into the path-search phase. Known as the Lazy A* PPA, this approach is implemented in path-finding method 52B of FIG. 6.

Figure 6:
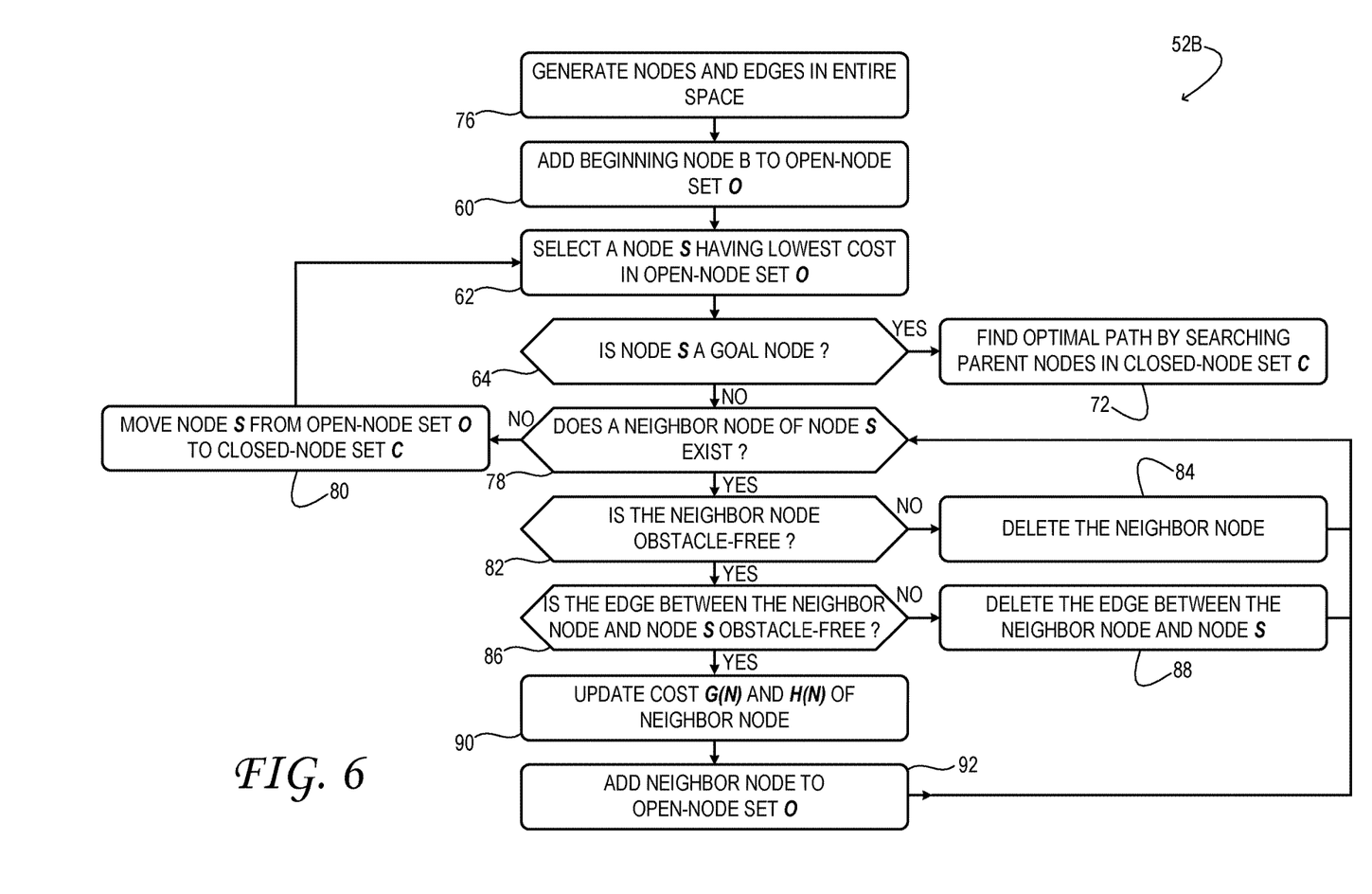

At 76 of method 52B, nodes and edges are generated in the entire graph space representing the environment. At 78 it is determined whether a neighbor node of node S exists on the navigation graph, but has not already been added to the open-node set. If the navigation graph includes no node N neighboring S, where N is not already included in O, then at 80 S is moved from the open-node set O to a closed-node set C. The method then returns to 62, where a subsequent node S of lowest cost is selected. However, if a neighbor node of node S does exist, then the method advances to 82, where it is determined whether the neighbor node is obstacle-free. If the neighbor node is not obstacle-free, then at 84 the neighbor node is deleted. If the neighbor node is obstacle free, then it is determined at 86 whether the edge between the neighbor node N and node S is obstacle-free. If the edge is not obstacle-free then, at 88, the edge is deleted. However, if both the neighbor node and the edge between the neighbor node and node S are obstacle free, then the method advances to 90, where the cost functions g(n) and h(n) of the neighbor node are updated, and to 92, where the neighbor node is added to open-node set O. The method then returns to 78.

Figure 7A:
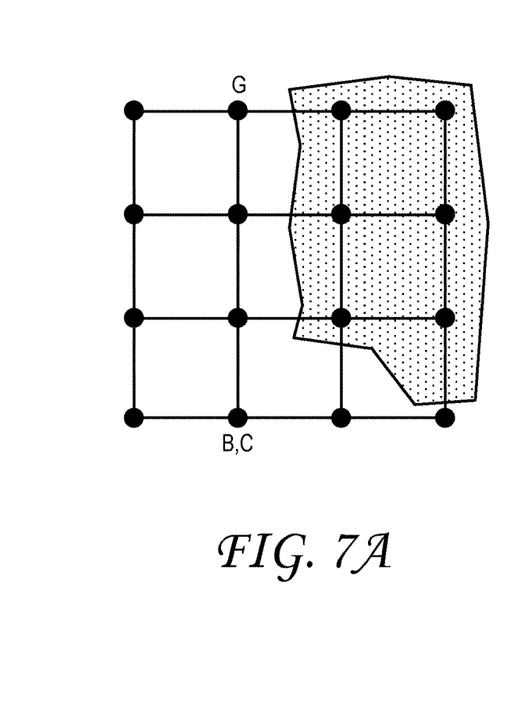
FIGS. 7A, 7B, and 7C show aspects of another occupancy grid map.
Figure 7B:
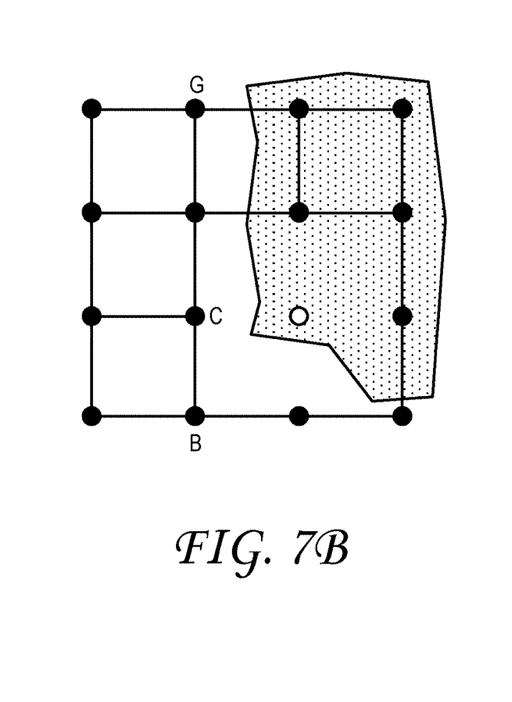
Figure 7C:
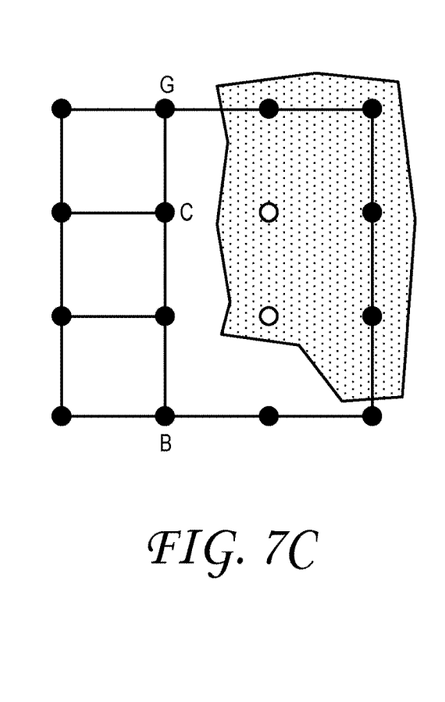

In the Lazy A* PPA, nodes and edges are initially generated in the graph-construction phase, regardless of obstacles, as shown in FIG. 7A. However, navigation nodes and edges are evaluated in the path-search phase only if they are obstacle-free. If a node or an edge is not obstacle-free, then that node or edge is deleted from the navigation graph, as shown in FIGS. 7B and 7C, which represent subsequent stages of graph construction.

Figure 8:
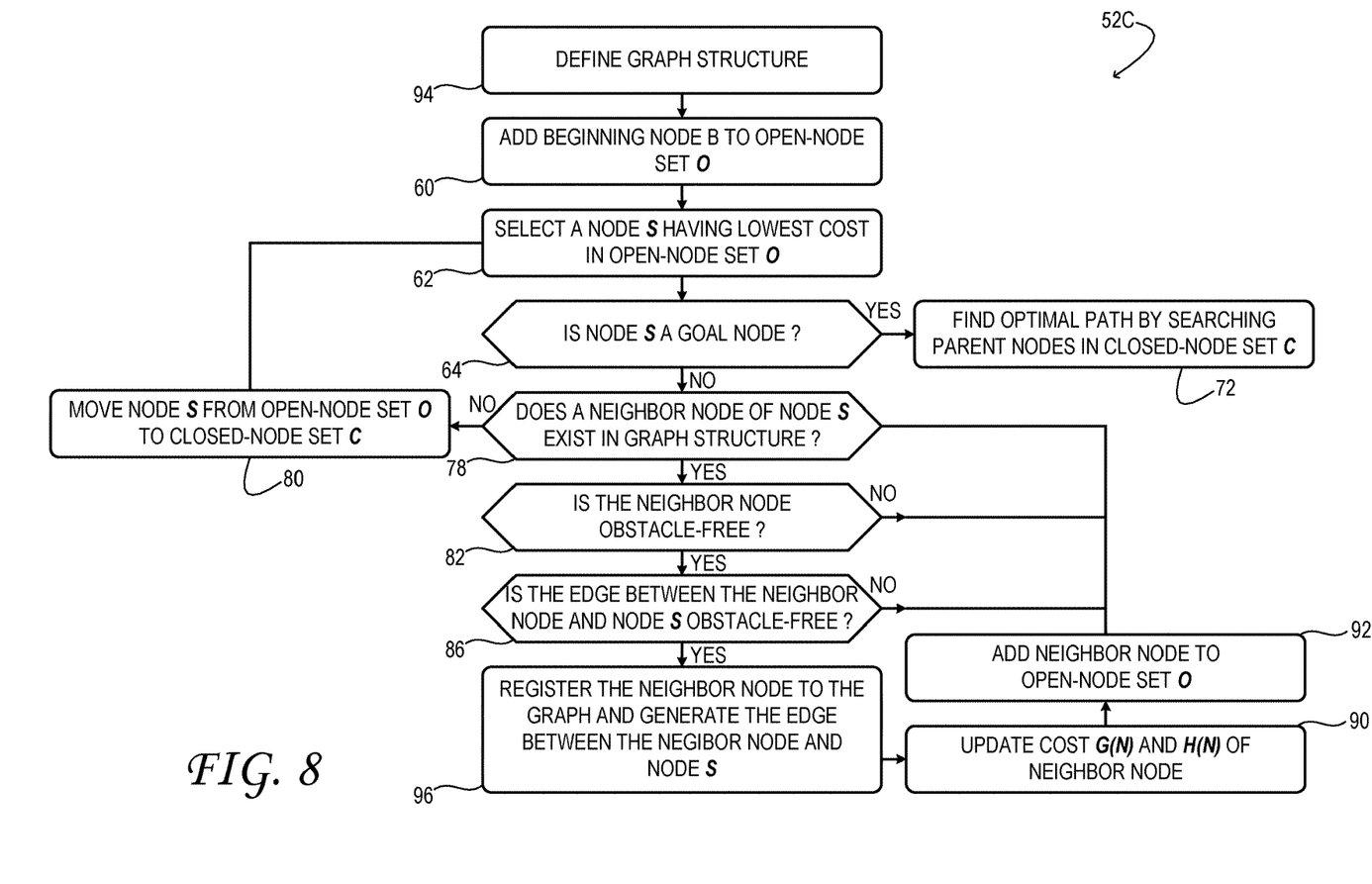
FIG. 8 illustrates another path-finding method.

To further reduce the computational expense of graph construction, it is possible to forego generating navigation nodes and edges explicitly in the graph-construction phase, but to define only the graph structure. Nodes and edges are constructed explicitly only during the path-search phase. FIG. 8 illustrates an example path-finding method 52C based on this approach.

At 94 of method 52C, a navigation graph structure corresponding to the environment is defined. The navigation graph structure includes a beginning node B and a goal node G. Defining the navigation graph structure may include, for each of a plurality of navigation nodes of the navigation graph structure, defining a position of that node. However, defining the navigation graph structure may not include, generally, for the plurality of navigation nodes of the navigation graph structure, evaluating a cost of the node, determining whether the node intersects an obstacle, or constructing an edge between that and any other node of the navigation graph structure. The cost of the beginning node B, however, may be initialized to any suitable value—e.g., zero. In some implementations, the navigation graph structure may include a grid or lattice—e.g., a flat 2D lattice, a 2D lattice adaptable to represent a topographic map of the environment, or an actual 3D lattice for aerial or undersea navigation. As used herein and elsewhere, a 'grid' or 'lattice' includes only points. This feature distinguishes the grid or lattice 'graph', which also includes edges. In other embodiments, the navigation graph structure may include an ensemble of points that do not necessarily correspond to a lattice.

Continuing in FIG. 8, if it is determined at 64 that S differs from goal node G, then it is determined at 78 whether the navigation graph structure includes a node N neighboring S, where N is not already included in open-node set O. If the navigation graph structure includes the node N, then the method advances to 82. At 82 it is determined whether N is obstacle-free, and at 86 it is determined whether an edge E connecting N and S is obstacle-free. If both N and E are obstacle-free, then the method advances to 96, where N is registered on and inserted into the navigation graph together with the generated edge E. Effectively, the new node is registered only if it is known to be obstacle-free, and the edge between each new node and the node S is generated only if there is no obstacle between the two nodes. The method then advances to 90, where the cost of N is updated, and to 92, where N is added to open-node set O. In the Lazier A* PPA, accordingly, nodes and edges are generated in the path-search phase according to the graph structure dimensioned during the initial graph-construction phase.

Figure 9A:
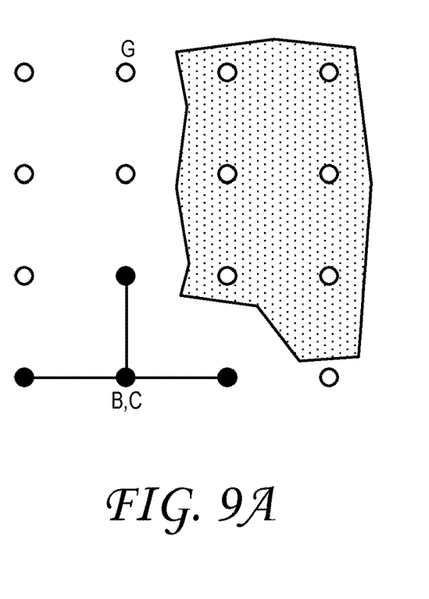
FIGS. 9A, 9B, and 9C show aspects of another occupancy grid map.
Figure 9B:
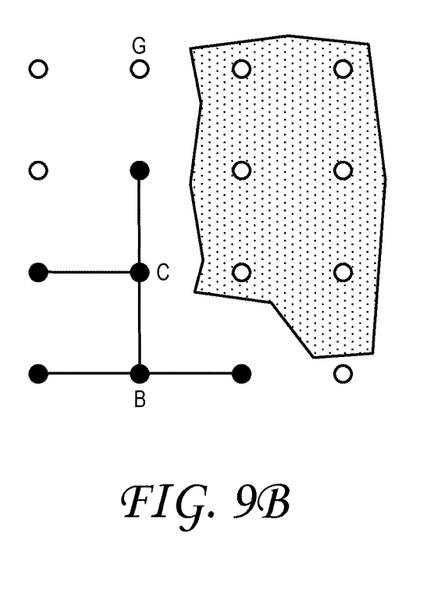
Figure 9C:
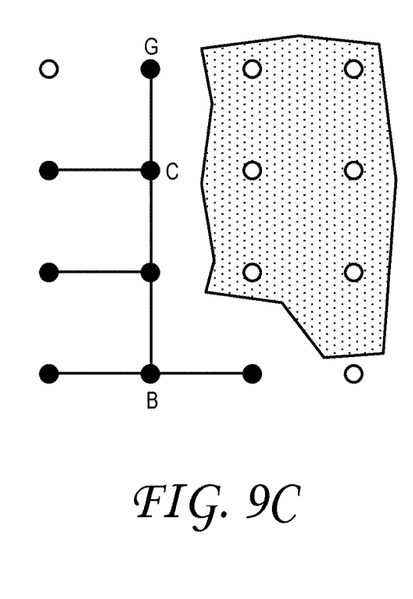

In method 52C, unlike method 52B, no previously evaluated node is deleted responsive to occlusion by the one or more obstacles. Likewise, no previously constructed edge is deleted responsive to intersection with the one or more obstacles. From 92 the method returns to 78, where it is determined whether the navigation graph structure includes an additional node N satisfying the conditions of 78. FIGS. 9A, 9B, and 9C show an example evolving navigation graph generated according to the above method as progress is made toward goal node G.

Figure 10A:
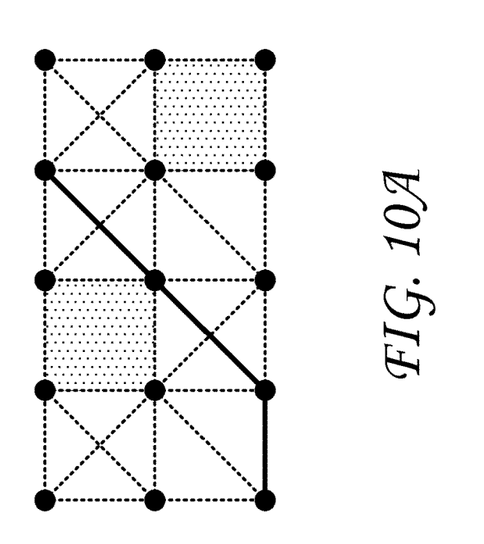
FIGS. 10A and 10B show aspects of another occupancy grid map.
Figure 10B:
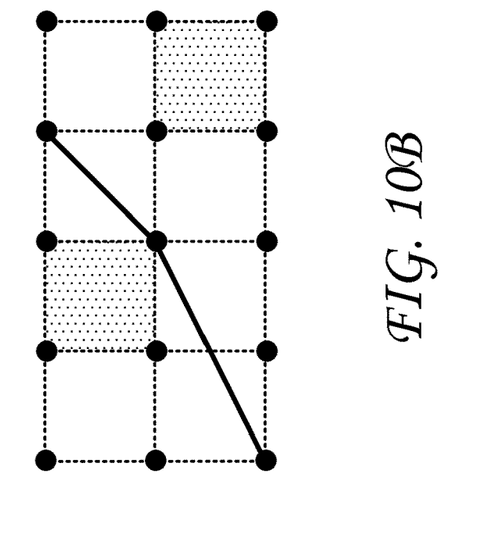
Figure 11A:
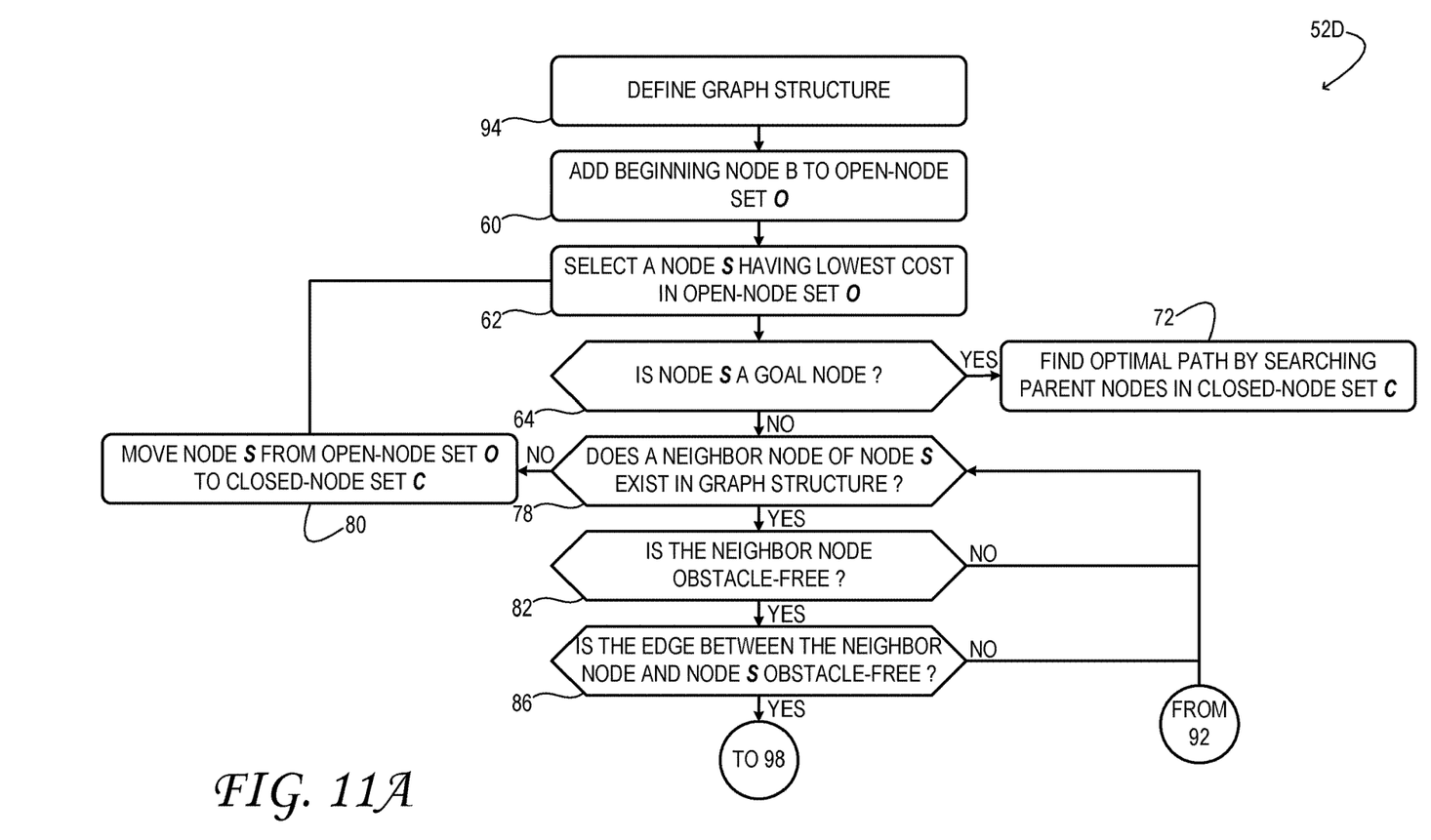
FIGS. 11A and 11B illustrate another path-finding method.
Figure 11B:
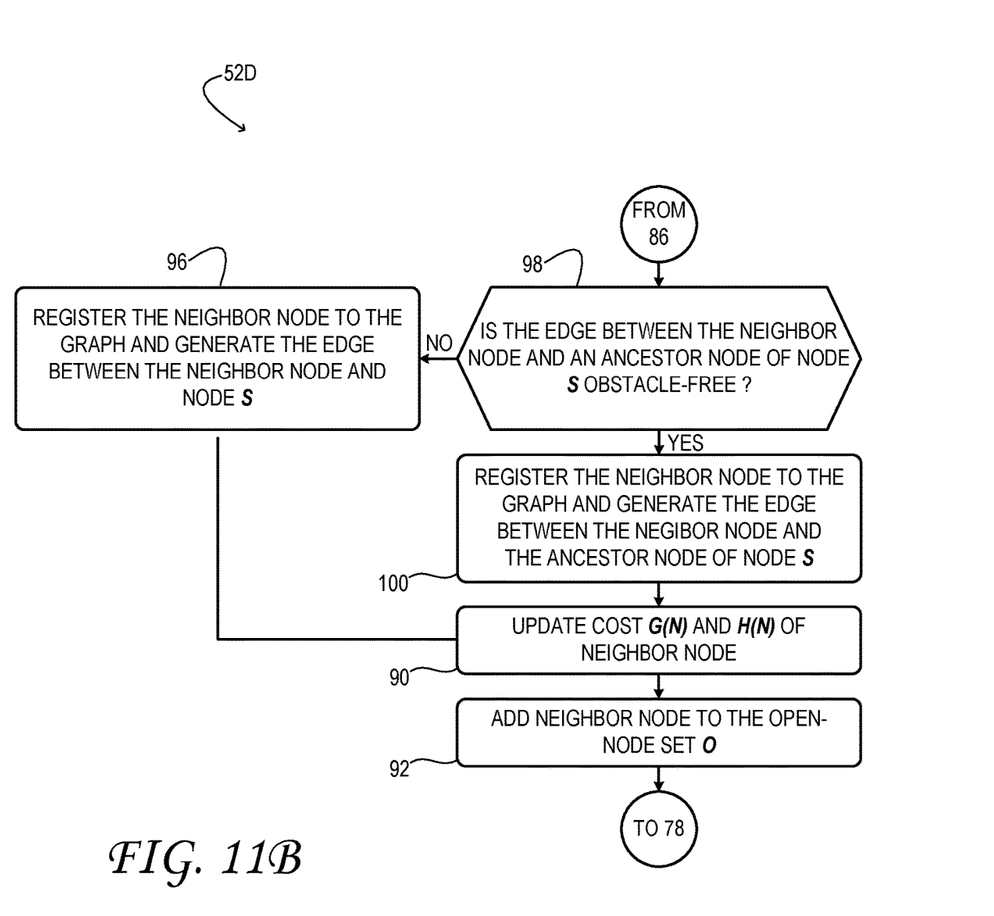

While A*, Lazy A*, and Lazier A* PPAs produce a path along rectangular grid edges, the Theta* PPA yields a shortened path, as shown in FIGS. 10A and 10B. Whenever a new node is open, Theta* generates an edge between the new node and its ancestor node if no obstacle is present between the two nodes. FIGS. 11A and 11B illustrate a non-limiting implementation of a Lazier Theta* PPA, in the form of path-finding method 52D. Similar to the approach taken in Lazier A*, a new node is selected among neighbors of the node S. However, Lazier Theta*, instead of generating an edge between every new node and the node S, constructs an edge between the new node and its ancestor node if no obstacle would intersect that edge.

In method 52D, if both N and E are obstacle-free, then the method advances to 98, where it is determined whether an edge E' connecting N and an ancestor node of S is obstacle-free. If both N and E' are obstacle-free, then, at 100, the neighbor node N is registered on and inserted into the navigation graph, together with the generated edge E'. In this scenario, updating the cost of N includes updating in view of the ancestor-connecting edge E'. Otherwise the method advances to 96, where the neighbor node is registered on and inserted into the navigation graph, and the edge between the neighbor node and node S is generated and inserted into the navigation graph. Accordingly, the edge E is generated when E is obstacle-free but E' is not obstacle-free.

Vehicle 10 and navigation device 14' are each configured with a processor and associated nonvolatile memory and volatile memory. The processor of each device is configured to execute instructions stored in nonvolatile memory using portions of volatile memory, to accomplish the processes described herein. It will be appreciated that the nonvolatile memory is configured to hold instructions even when power is cut, whereas data is lost in volatile memory upon loss of power. Although the navigation device 14' is illustrated as a portable computing device (in particular, a smartphone) it will be appreciated that it may also take the form of a laptop, desktop, tablet, onboard navigation device (mounted, e.g., in the console of a vehicle), etc. It will be appreciated that the processor may be configured as one processor, distributed processors, a single core or multi-core processor, or a virtualized processor running on hardware. The processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The processor may include one or more physical processors (hardware) configured to execute software instructions. Additionally or alternatively, the processor may include one or more hardware logic circuits or firmware devices configured to execute hardware-implemented logic or firmware instructions. The processors described herein may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the processor may be virtualized and executed by remotely accessible, networked computing devices configured in a cloud-computing configuration. In such a case, these virtualized aspects are run on different physical logic processors of various different machines.

The nonvolatile memory includes one or more physical devices configured to hold instructions executable by the logic processors to implement the methods and processes described herein. When such methods and processes are implemented, the state of nonvolatile memory may be transformed—e.g., to hold different data.

Nonvolatile memory may include physical devices that are removable and/or built-in. A nonvolatile storage device may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass-storage device technology. Nonvolatile storage memory may include nonvolatile, dynamic, static, read/write, read-only, sequential-access, location-addressable, file-addressable, and/or content-addressable devices. It will be appreciated that nonvolatile memory is configured to hold instructions even when power is cut to the nonvolatile storage device.

Volatile memory may include physical devices that include random access memory. Volatile memory is typically utilized by a logic processor to temporarily store information during processing of software instructions. It will be appreciated that volatile memory typically does not continue to store instructions when power is cut to the volatile memory.

Aspects of processor, volatile memory, and nonvolatile storage device may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of computing system implemented to perform a particular function. In some cases, a module, program, or engine may be instantiated via logic processor executing instructions held by nonvolatile storage device, using portions of volatile memory. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine" may encompass individual or groups of executable files, data files, libraries, drivers, scripts, database records, etc.

A display may be used to present a visual representation of data held by nonvolatile storage device. This visual representation may take the form of a graphical user interface (GUI). As the herein described methods and processes change the data held by the nonvolatile storage device, and thus transform the state of the nonvolatile storage device, the state of display may likewise be transformed to visually represent changes in the underlying data.

An input subsystem may be provided, which comprises one or more user-input devices such as a keyboard, mouse, or touch screen.

A communication subsystem may be provided and configured to communicatively couple computing system with one or more other computing devices. Communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be understood that the articles, systems, and methods described hereinabove are embodiments of this disclosure—non-limiting examples for which numerous variations and extensions are contemplated as well. This disclosure also includes all novel and non-obvious combinations and sub-combinations of the above articles, systems, and methods, and any and all equivalents thereof.

The invention claimed is:

1. A navigation method comprising:
receiving data modeling an environment to be traversed, the data representing one or more obstacles within the environment;
defining a navigation graph structure corresponding to the environment, wherein the navigation graph structure is a lattice, the navigation graph structure including a beginning node B and a goal node G;
including the beginning node B in an open-node set O;
selecting, from the open-node set O, a node S of lowest cost;
if S differs from the goal node G, then determining whether the navigation graph structure includes a node N neighboring S, where N is not already included in the open-node set O;
if the navigation graph structure includes the node N, then determining whether N is obstacle-free and determining whether an edge E connecting N and S is obstacle-free, and, if both N and E are obstacle-free, then inserting N into the navigation graph, generating and inserting E into the navigation graph, updating a cost of N, including N in the open-node set O, and returning to said determining whether the navigation graph structure includes a node N;
if the navigation graph structure includes no node N neighboring S, where N is not already included in O, then excluding S from the open-node set O, including S in a closed-node set C, and returning to said selecting a node S of lowest cost;
if S coincides with the goal node G, then finding an optimal path from B to G, including searching each node in C for a parent node in C; and
reporting the optimal path to a navigation system to guide traversal of the environment.

2. The method of claim 1 further comprising:
if both N and E are obstacle-free, then determining whether an edge E' connecting N and an ancestor node of S is obstacle-free, and, if both N and E' are obstacle-free, then generating E', wherein updating the cost of N includes updating in view of E'.

3. The method of claim 2 wherein the edge E is generated when E is obstacle-free but E' is not obstacle-free.

4. The method of claim 1 wherein defining the navigation graph structure includes, for each of a plurality of navigation nodes of the navigation graph structure, defining a position of that node.

5. The method of claim 4 wherein defining the navigation graph structure does not include, for any of the plurality of navigation nodes of the navigation graph structure, evaluating a cost of the node, determining whether the node intersects an obstacle, or constructing an edge between that and any other node of the navigation graph structure.

6. The method of claim 1 wherein the navigation graph structure is adaptable to represent a topographic map of the environment.

7. The method of claim 1 wherein no previously evaluated node is deleted responsive to occlusion by the one or more obstacles.

8. The method of claim 1 wherein no previously constructed edge is deleted responsive to intersection of the one or more obstacles.

9. An autonomous vehicle comprising:
a path-finding system including a processor and an associated nonvolatile memory, the nonvolatile memory holding instructions that cause the processor to:
receive data modeling an environment to be traversed, the data representing one or more obstacles within the environment,
define a navigation graph structure corresponding to the environment, wherein the navigation graph structure is a lattice, the navigation graph structure including a beginning node B and a goal node G, including the beginning node B in an open-node set O, select, from the open-node set O, a node S of lowest cost, if S differs from the goal node G, then determine whether the navigation graph structure includes a node N neighboring S, where N is not already included in the open-node set O, if the navigation graph structure includes the node N, then determine whether N is obstacle-free and determine whether an edge E connecting N and S is obstacle-free, and, if both N and E are obstacle-free, then insert N into the navigation graph, generate and insert E into the navigation graph, update a cost of N, include N in the open-node set O, and return to said determine whether the navigation graph structure includes a node N, if the navigation graph structure includes no node N neighboring S, where N is not already included in O, then exclude S from the open-node set O, include S in a closed-node set C, and return to said select a node S of lowest cost, and if S coincides with the goal node G, then find an optimal path from B to G, including searching each node in C for a parent node in C;

a navigation system configured to receive the optimal path as navigation data and to formulate drive data for driving the vehicle along the optimal path; and a drive system configured to receive the drive data and to drive the vehicle along the optimal path pursuant to the drive data.

10. The vehicle of claim 9 wherein the instructions further cause the processor to:

if both N and E are obstacle-free, then determine whether an edge E' connecting N and an ancestor node of S is obstacle-free, and, if both N and E' are obstacle-free, then generate E', wherein updating the cost of N includes updating in view of E', wherein the edge E is generated when E is obstacle-free but E' is not obstacle-free.

11. The vehicle of claim 9 wherein the drive system includes a land- or water-contacting drive element.

12. The vehicle of claim 9 further comprising a machine-vision system.

13. The vehicle of claim 12 wherein the machine-vision system is configured to detect the one or more obstacles, and wherein at least some of the data modeling the environment is received from the machine-vision system.

14. The vehicle of claim 9 further comprising an inertial-measurement unit.

15. The vehicle of claim 14 wherein the inertial-measurement unit is configured to detect the one or more obstacles, and wherein at least some of the data modeling the environment is received from the inertial-measurement unit.

16. The vehicle of claim 9, further comprising a communication system, wherein at least some of the data modeling the environment is received from the communication system.

17. A navigation device comprising:

a path-finding system including processor and an associated nonvolatile memory, the nonvolatile memory holding instructions that cause the processor to:

receive data modeling an environment to be traversed, the data representing one or more obstacles within the environment, define a navigation graph structure corresponding to the environment, wherein the navigation graph structure is a lattice, the navigation graph structure including a beginning node B and a goal node G, add the beginning node B to an open-node set O, select, from the open-node set O, a node S of lowest cost, if S differs from the goal node G, then determine whether the navigation graph structure includes a node N neighboring S, where N is not already included in the open-node set O, if the navigation graph structure includes the node N, then determine whether N is obstacle-free and determine whether an edge E connecting N and S is obstacle-free, and, if both N and E are obstacle-free, then insert N into the navigation graph, generate and insert E into the navigation graph, update a cost of N, include N in the open-node set O, and return to said determine whether the navigation graph structure includes a node N, if the navigation graph structure includes no node N neighboring S, where N is not already included in O, then exclude S from the open-node set O, include S in a closed-node set C, and return to said select a node S of lowest cost, and if S coincides with the goal node G, then find an optimal path from B to G, including searching each node in C for a parent node in C; and a display configured to receive the optimal path as navigation data and to represent the optimal path in a human-readable format.

18. The navigation device of claim 17, wherein the navigation device is a portable device.

19. The navigation device of claim 17, wherein the navigation device is installed in a vehicle.

* * * * *